(12) United States Patent
Dulong

(10) Patent No.: US 8,696,292 B2
(45) Date of Patent: Apr. 15, 2014

(54) UNLOADING AUGER ELBOW

(75) Inventor: Renee A. Dulong, Milan, IL (US)

(73) Assignee: Deere & Company, Moline, IL (US)

( * ) Notice: Subject to any disclaimer, the term of this patent is extended or adjusted under 35 U.S.C. 154(b) by 378 days.

(21) Appl. No.: 12/421,110

(22) Filed: Apr. 9, 2009

(65) Prior Publication Data

US 2009/0297312 A1   Dec. 3, 2009

Related U.S. Application Data

(60) Provisional application No. 61/057,621, filed on May 30, 2008.

(51) Int. Cl.
*B65G 1/00*   (2006.01)

(52) U.S. Cl.
USPC ............ 414/310; 414/505; 414/523; 198/312

(58) Field of Classification Search
USPC ................ 414/523, 310, 505; 198/312, 861.1
See application file for complete search history.

(56) References Cited

U.S. PATENT DOCUMENTS

| | | | |
|---|---|---|---|
| 4,455,922 A | 6/1984 | Brelsford et al. | |
| 4,866,920 A | 9/1989 | Kerckhove et al. | |
| 5,511,925 A * | 4/1996 | Muth | 414/310 |
| 6,247,886 B1 | 6/2001 | Signer et al. | |
| 6,662,815 B2 * | 12/2003 | Tung | 135/20.1 |
| 6,669,240 B1 | 12/2003 | Signer et al. | |
| 2001/0026755 A1 * | 10/2001 | Wood et al. | 414/523 |
| 2006/0104770 A1 | 5/2006 | Talibi et al. | |

FOREIGN PATENT DOCUMENTS

| | | |
|---|---|---|
| EP | 0478847 B1 | 8/1992 |
| EP | 118622 B1 | 3/2002 |
| EP | 1186222 A | 3/2002 |
| GB | 1536608 | 1/1979 |
| WO | 2008002368 A | 1/2008 |

OTHER PUBLICATIONS

European Search Report dated Oct. 2, 2009 (4 pages).

* cited by examiner

*Primary Examiner* — Saul Rodriguez
*Assistant Examiner* — Willie Berry, Jr.

(57) ABSTRACT

An unloading auger elbow for use on an agricultural harvester, comprising an unloading auger elbow assembly with a unitary cast body on which a pivot joint is mounted.

8 Claims, 3 Drawing Sheets

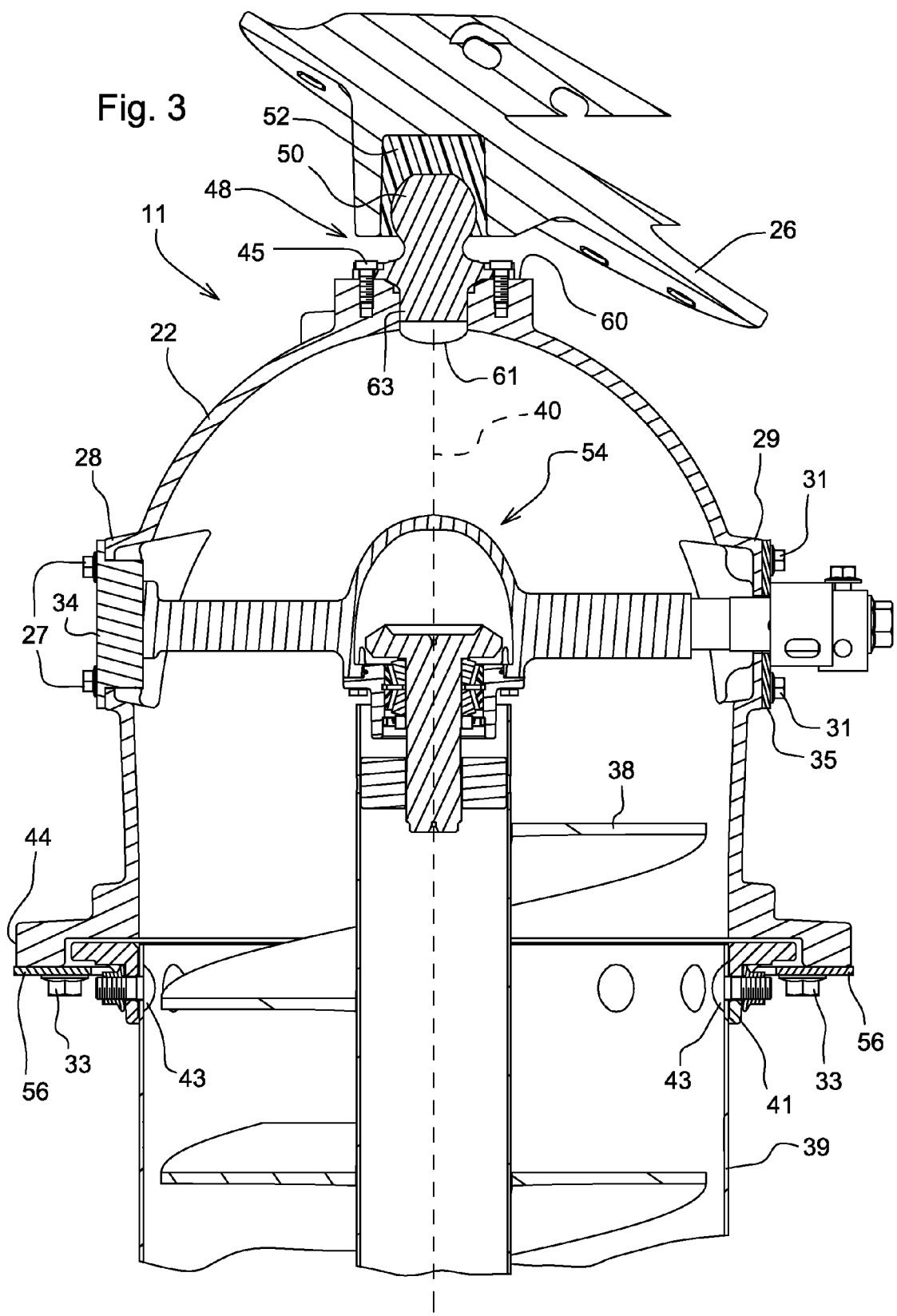

UNLOADING AUGER ELBOW

CROSS REFERENCE TO RELATED APPLICATIONS

This is a non-provisional application based upon U.S. provisional patent application Ser. No. 61/057,621 entitled "Unloading Auger Elbow Assembly", filed May 30, 2008, which is incorporated herein by reference.

FIELD OF THE DISCLOSURE

The invention relates to unloading auger elbow assemblies for agricultural harvesters.

BACKGROUND OF THE DISCLOSURE

Agricultural harvesters use internal mechanisms to thresh, separate, and clean grain. They then elevate and temporarily store the grain in a bin, and the bin is then unloaded using an unloading auger.

The unloading auger comprises a generally vertical auger, a generally horizontal auger, and an unloading auger elbow. The vertical auger lifts and transfers the grain from the bin to the auger elbow. Then, the unloading auger elbow transfers the grain to the horizontal auger. Finally, the grain exits the horizontal auger and is stored in a receptacle such as a grain cart.

The unloading auger elbow comprises an auger elbow. Auger elbows comprise a plurality of parts and manufacturing steps. Traditionally, they are formed by welding together a first half and a second half, each half forming a semicircular tubular portion. This arrangement provides two long welds, one weld extending from the outlet to the inlet on the inside curve of the elbow, and one weld extending from the outlet to the inlet on the outside curve of the elbow. Once the two halves are welded together, a pivot joint mount and gussets are welded to the two halves and circular inlet flanges and outlet flanges are welded or bolted to the two halves. A pivot joint member is then fastened to the pivot joint mount.

Auger elbows can be difficult and expensive to manufacture. This is because their parts are challenging to align, and also because there are so many welds to make. When misalignment does occur, it can increase the wear rate of the auger elbow. For example, increased wear rates are often visible, on the parts that move relative to one another, along the grain inlet side of auger elbows. An additional problem with auger elbows is that they are relatively weak, in comparison to the high forces that are applied to them, and often fail. In particular, auger elbows are especially prone to failure along their welded joints.

In response to these problems, the applicant provides an unloading auger elbow that comprises an auger elbow comprised of a unitary cast tubular body, instead of the two half-elbows that are welded together to form the body of the traditional auger elbow. A unitary cast body design is easier and less expensive to manufacture and provides improved alignment characteristics.

In addition, the auger elbow that the applicant provides has an annular machined surface, which is configured to support the unloading auger elbow on the vertical auger. The annular machined surface is machined concentric with a pivot axis. This arrangement further improves the alignment and rotation characteristics of the auger elbow and, ultimately, the entire unloading auger.

SUMMARY OF THE DISCLOSURE

In accordance With one invention disclosed herein, unloading auger elbow for use on an agricultural harvester, comprising a unitary cast body. The body has a grain inlet configured to receive a flow of grain from a vertical auger. The unloading auger elbow has a grain outlet configured to transmit the flow of grain to a horizontal auger. The unitary cast body comprises a pivot joint mounting surface machined in the auger elbow.

The unloading auger elbow further comprises a pivot joint fastened to the pivot joint mounting surface. The pivot joint comprises a first pivot member and a second pivot member. The first pivot member is fastened to the pivot joint, mounting, surface, and the second pivot member is coupled to the first pivot member to pivot with respect thereto about a pivot axis.

The cast body further comprises an annular machined surface configured to support the unloading auger elbow on the vertical auger. The annular machined surface is machined concentric with the pivot axis. In addition, the annular machined surface is concentric with the pivot joint mounting surface.

BRIEF DESCRIPTION OF THE DRAWINGS

FIG. 3 is a cross sectional view taken at section line 3-3 of the agricultural harvester in FIG. 1 of the unloading auger elbow.

DETAILED DESCRIPTION OF THE DRAWINGS

Figure 1:
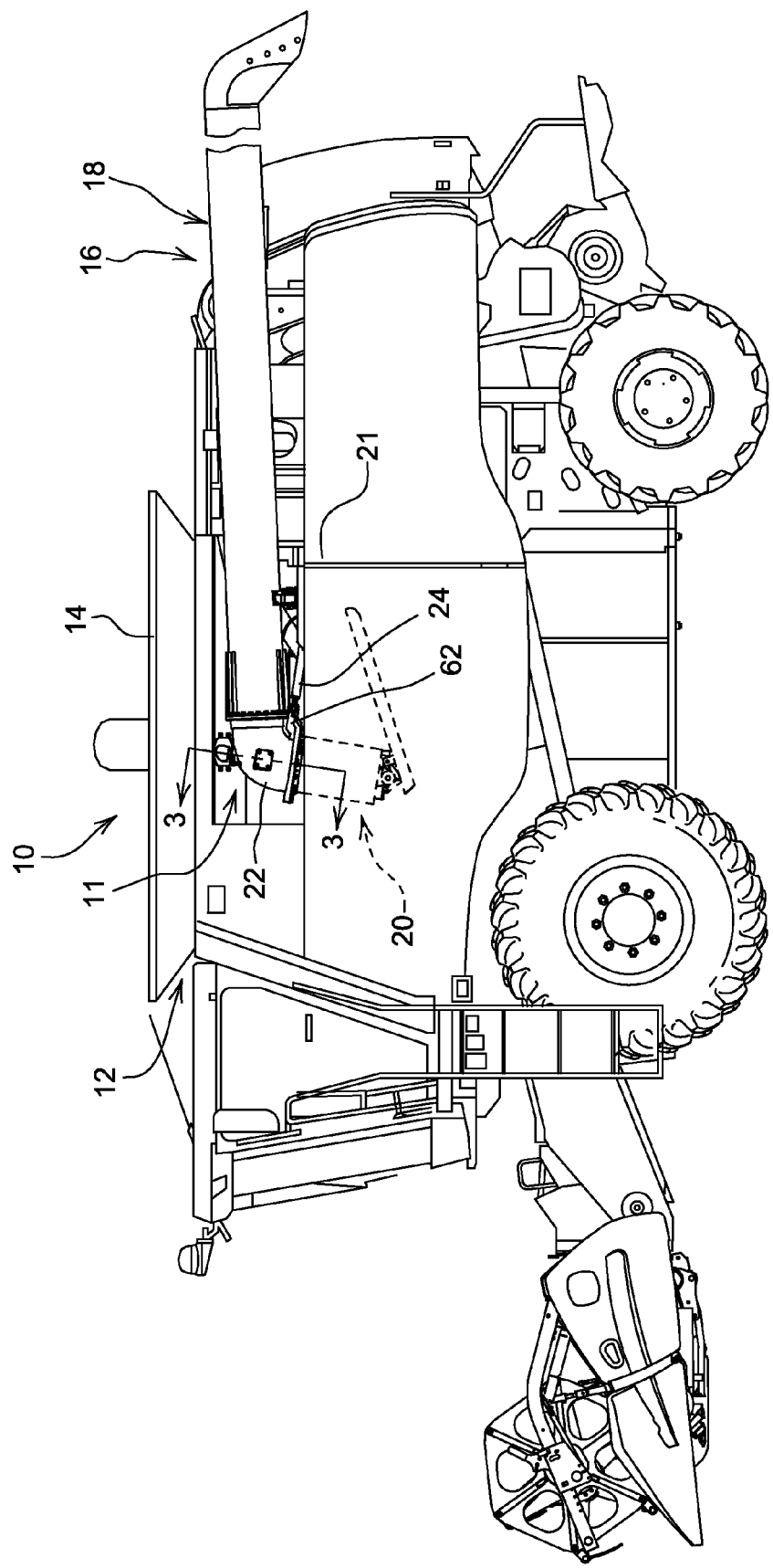
FIG. 1 is a side elevational view of an agricultural harvester incorporating an unloading auger elbow and an unloading auger in its transport position.

The agricultural harvester 10 in FIG. 1 has a grain holding bin 12 provided with downwardly converging, hopper-like extensions 14 that provide extra holding capacity for bin 12. Grain that has been threshed, separated and cleaned by internal mechanisms (not shown) of the harvester 10 is elevated and temporarily stored in bin 12 until unloaded either on-the-go or at a standstill into a receptacle (not shown). An unloading auger 16 is utilized for this purpose and comprises a generally vertical auger 20, a generally horizontal auger 18, and an unloading auger elbow 11. The unloading auger 16 is shown in its transport position.

The unloading auger elbow 11 comprises a body 22. A hydraulic cylinder 24 is linked to a pivot arm connector 62. The hydraulic cylinder 24 is also linked to a chassis 21.

Figure 2:
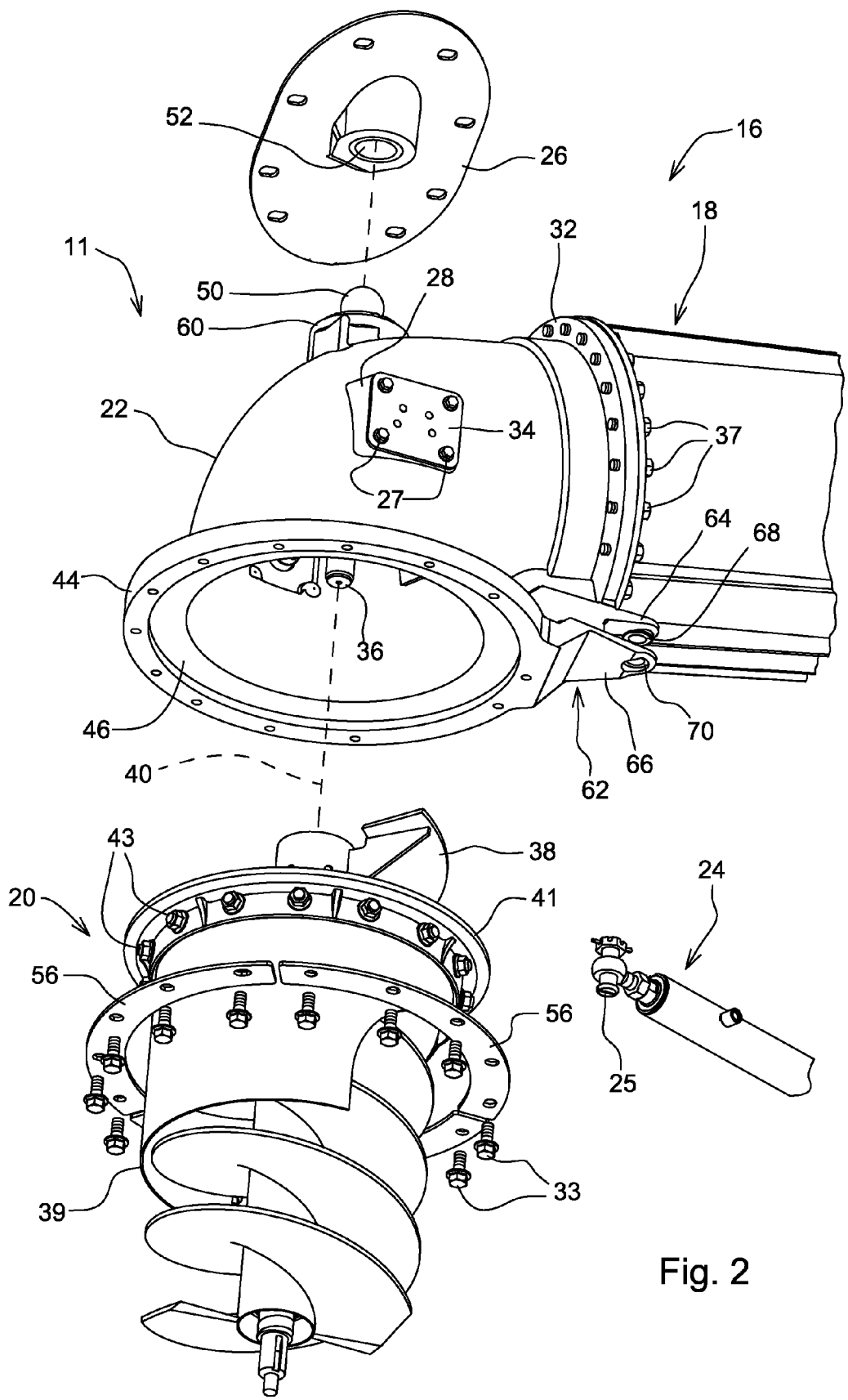
FIG. 2 is an exploded view of an unloading auger elbow.

Referring now to FIG. 2 and FIG. 3, the unloading auger 16 is shown. The body 22 is formed as a unitary cast body. The body 22 defines an angle between the axis of its inlet and the axis of its outlet of generally 90°, and preferably between 70° and 90°. The body 22 has a grain inlet surrounded by an axially stepped annular flange 44, the inlet being configured to receive a flow of grain from the generally vertical auger 20, and a grain outlet (not visible) surrounded by an annular flange 32, the outlet being configured to transmit the flow of grain to the generally a horizontal auger 18. The annular flanges 44 and 32 are illustrated as being circular in shape.

The body 22 further comprises an annular, axially facing mounting surface 46 that is machined circular, and is formed on the annular flange 44 to extend completely around the grain inlet of the body 22. The annular machined surface 46 is configured to support and align the unloading auger elbow 11 on the generally vertical auger 20. The annular machined surface 46 is machined concentric with a pivot axis 40.

The body 22 further comprises a pivot joint mounting member 60 located on a top exterior region of the body 22 along the pivot axis 40. A pivot joint 48 is fastened to the pivot joint mounting member 60. The pivot joint mounting member 60 includes a flat upper surface machined generally perpendicular to pivot axis 40 and a cylindrical hole 61 that, like the annular machined surface 48, is centered on the pivot axis 40 and a cylindrical hole 61 that is concentric with the annular machined surface 46 and the pivot axis 40. Cylindrical hole 61 is configured to receive a cylindrical portion 63 of a first pivot member 50.

The pivot joint 48 comprises the first pivot member 50 and a second pivot member 52. The first pivot member 50 includes an annular mounting portion overlying the machined mounting surface of, and is fastened to the pivot joint mounting member 60 with first pivot member fasteners 45. The second pivot member 52 is coupled to the first pivot member 50 so as to permit the first pivot member 50 to pivot with respect thereto about the pivot axis 40.

The first pivot member 50 includes a spherical mating surface. The first pivot member 50 is preferably made of steel or cast-iron. The second pivot member 52 includes a spherical socket. The second pivot member 52 is preferably made out of plastic or a soft metal conformable to the mating surface of the first pivot member.

The second pivot joint member 52 is fastened to a pivot joint bracket 26, and the pivot joint bracket 26 is fastened to the chassis (see FIG. 1).

The body 22 further comprises a pivot arm connector 62 formed integral with the body 22. Exemplarily, the pivot arm connector 62 comprises a top portion 64 with a top hole 68 and a bottom portion 66 with a bottom hole 70. The top and bottom holes 68, 70 are concentric with one another.

The unloading auger elbow 11 further comprises a hydraulic cylinder 24 that is connected to the pivot arm connector 62 with a first hydraulic cylinder pin 25. The hydraulic cylinder 24 is also attached to the chassis (see FIG. 1) with a second hydraulic cylinder pin (not shown). The hydraulic cylinder 24 pivots the unloading auger 16 about the axis 40 between a transport position and an unloading position. In the transport position, the horizontal auger 18 is generally parallel to the chassis (see FIG. 1). In the unloading position, the horizontal auger 18 forms an angle of up to 90° or more with the chassis (see FIG. 1).

The generally vertical auger 20 comprises a central cylindrical core carrying flighting 38 that is disposed within and is driven in rotation with respect to a stationary auger tube 39 having the pivot axis 40 at its center. This rotary motion lifts grain from the grain holding bin 12 to the grain inlet of the auger elbow 11. An auger tube flange 41 is fixed to the upper end of the auger tube 39 and is disposed to support the unloading auger elbow for pivoting about axis 40. Auger tube flange 41 mates with the annular machined surface 46. Furthermore, the auger tube flange 41 is fastened to the auger tube 39 with a plurality of fasteners 43. The tube flange 41 is retained against the annular machined surface 46 with a plurality of retainers 56. The retainers 56 are retained against an annular, axially facing surface surrounding the flange 41 with a plurality of fasteners 33. A The core carrying the flighting 38 mates with a shaft 36. The core of the flighting 38 transmits power to the shaft 36 with, for example, a plurality of splines or a key.

The body 22 further comprises first and second mating surfaces 28, 29 that are formed in the body 22. A first mounting bracket 34 is retained against the first mating surface 28 with a plurality of first mounting bracket fasteners 27. Furthermore, a second mounting bracket 35 is retained against the second mounting surface 29 with a plurality of second mounting bracket fasteners 31.

The first and second mounting brackets 34, 35 secure a gear box 54 in the inside of the body 22. The gear box 54 transmits power from the generally vertical auger flighting 38 to a generally horizontal length of auger flighting (not shown). Additionally, the auger flighting 38 conveys the grain upwardly through the grain inlet of the unloading auger elbow 22 and to the horizontal length of auger flighting (not shown) which then conveys the grain through the outlet of the elbow 22 and through the tube of the generally horizontal auger 18 for discharge into the receptacle (not shown).

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are provided to help the reader understand the invention, and do not limit the scope of the claims.

The invention claimed is:

1. An unloading auger elbow for use on an agricultural harvester, comprising:
a unitary tubular cast body having a circular grain inlet centered on a generally vertical pivot axis and being configured to receive a flow of grain from a generally vertical auger tube of a generally vertical auger assembly, and a circular grain outlet configured to transmit the flow of grain to a generally horizontal auger tube of a generally horizontal auger assembly,
wherein the unitary tubular cast body includes a pivot joint mounting member forming an upper exterior region of said elbow at a location along said pivot axis, with said mounting member including an upper machined mounting surface extending approximately perpendicular to, and surrounding said pivot axis; and
a pivot joint centered along said pivot axis and being fastened to the pivot joint mounting member,
wherein the pivot joint comprises a first pivot member and a second pivot member, and further wherein the first pivot member includes a bottom surface disposed in engagement with said upper machined mounting surface of the pivot joint mounting member, and the second pivot member is coupled to the first pivot member so as to permit the first pivot member to pivot with respect thereto about said pivot axis; and
wherein the tubular cast body further comprises a second machined surface configured to support the unloading auger elbow assembly on the generally vertical auger tube of the generally horizontal auger assembly, and the second machined surface being annular and machined concentric with, and approximately perpendicular to, the pivot axis and adjacent said inlet, and
wherein the tubular cast body further comprises an integral annular flange centered on said pivot axis and surrounding said inlet, and a pivot arm connector being formed integrally with said flange.

2. The unloading auger elbow, as defined in claim 1, wherein the unloading auger elbow further comprises a hydraulic cylinder that is attached to the pivot arm connector and is adapted for attachment to a chassis of the agricultural harvester.

3. An unloading auger elbow for use on an agricultural harvester, said auger elbow comprising:
a unitary tubular cast body having a circular grain inlet centered on a pivot axis and being configured to receive a flow of grain from a generally vertical auger tube of a generally vertical auger assembly, and a circular grain outlet configured to transmit the flow of grain to a generally horizontal auger tube of a generally horizontal auger assembly, wherein the unitary tubular cast body includes a pivot joint mounting member forming a top exterior region of said elbow at a location along said pivot axis, with said mounting member including an upper machined mounting surface extending approximately perpendicular to, and surrounding said pivot axis; and a pivot joint centered along said pivot axis and being fastened to the pivot joint mounting member, wherein the pivot joint comprises a first pivot member and a second pivot member, and further wherein the first pivot member includes a bottom surface disposed in engagement with said upper machined mounting surface of the pivot joint mounting member, and the second pivot member is coupled to the first pivot member so as to permit the first pivot member to pivot with respect thereto about said pivot axis; and wherein the tubular cast body further comprises a second machined surface configured to support the unloading auger elbow assembly on the generally vertical auger tube of the generally horizontal auger assembly, and the second machined surface being annular and machined concentric with, and approximately perpendicular to, the pivot axis and adjacent said inlet, and wherein the cast body further comprises first and second mating surfaces that are formed on opposite sides respectively of the auger elbow.

4. An unloading auger elbow for use on an agricultural harvester, said auger elbow comprising:

a unitary tubular cast body having a circular grain inlet centered on a pivot axis and being configured to receive a flow of grain from a generally vertical auger tube of a generally vertical auger assembly, and a circular grain outlet configured to transmit the flow of grain to a generally horizontal auger tube of a generally horizontal auger assembly, wherein the unitary tubular cast body includes a pivot joint mounting member forming an upper exterior region of said elbow at a location along said pivot axis, with said mounting member including an upper machined mounting surface extending approximately perpendicular to, and surrounding, said pivot axis; and a pivot joint centered along said pivot axis and being fastened to the pivot joint mounting member, wherein the pivot joint comprises a first pivot member and a second pivot member, and further wherein the first pivot member includes a bottom surface disposed in engagement with said upper machined mounting surface of the pivot joint mounting member, and the second pivot member is coupled to the first pivot member so as to permit the first pivot member to pivot with respect thereto about said pivot axis; and wherein the tubular cast body further comprises a second machined surface configured to support the unloading auger elbow assembly on the generally vertical auger tube of the generally horizontal auger assembly, and the second machined surface being annular and machined concentric with, and approximately perpendicular to, the pivot axis and adjacent said inlet, and wherein the cast body further comprises a pivot arm connector formed on the auger elbow, and first and second mating surfaces formed on opposite sides respectively of the auger elbow.

5. An agricultural harvester comprising:

a grain tank having an outlet;

an unloading auger coupled to the outlet for receiving grain therefrom and for conveying the grain from the combine to a nearby container, the unloading auger comprising a generally vertical auger tube and a generally horizontal auger tube and a tubular unloading auger elbow coupling the vertical and horizontal auger tubes together, wherein the unloading auger elbow comprises:

a unitary tubular cast body having a circular grain inlet centered on a pivot axis and configured for receiving a flow of grain from said generally vertical auger tube, and a grain outlet configured for transmitting the flow of grain to said generally horizontal auger tube, wherein the unitary tubular cast body comprises a pivot joint mounting member forming an upper exterior region of said elbow at a location along, and traversing, said pivot axis, with said mounting member including a planar first machined surface surrounding said pivot axis; and a pivot joint centered along said pivot axis and being fastened to the pivot joint mounting member, wherein the pivot joint comprises a first pivot member and a second pivot member, and further wherein the first pivot member includes an annular surface disposed in engagement with said first machined surface of the pivot joint mounting member, and wherein the second pivot member is coupled to the first pivot member so as to permit the first pivot member to pivot with respect to the second pivot member about said pivot axis; and wherein the tubular cast body further comprises a second machined surface configured to support the unloading auger elbow assembly on the generally vertical auger tube, and the second machined surface being machined concentric with the first pivot axis and substantially parallel to the first machined surface and being adjacent said inlet, and wherein the cast body further comprises an annular flange adjacent said inlet and centered on said pivot axis, and a pivot arm connector being formed integrally with said flange.

6. The agricultural harvester, as defined in claim 5, wherein the unloading auger elbow further comprises a hydraulic cylinder that is attached to the pivot arm connector and to a chassis of the agricultural harvester.

7. The agricultural harvester, as defined in claim 6, wherein the cast body further comprises first and second mating surfaces formed on opposite sides of the auger elbow.

8. An agricultural harvester comprising:

a grain tank having an outlet;

an unloading auger coupled to the outlet for receiving grain therefrom and for conveying the grain from the combine to a nearby container, the unloading auger comprising a generally vertical auger tube and a generally horizontal auger tube and a tubular unloading auger elbow coupling the vertical and horizontal auger tubes together, wherein the unloading auger elbow comprises:

a unitary tubular cast body having a circular grain inlet centered on a pivot axis and configured for receiving a flow of grain from said generally vertical auger tube, and a grain outlet configured for transmitting the flow of grain to said generally horizontal auger tube, wherein the unitary tubular cast body comprises a pivot joint mounting member forming an upper exterior region of said elbow at a location along, and traversing, said pivot axis, with said mounting member including a planar first machined surface surrounding said pivot axis; and a pivot joint centered along said pivot axis and being fastened to the pivot joint mounting member, wherein the pivot joint comprises a first pivot member and a second pivot member, and further wherein the first pivot member includes an annular surface disposed in engagement with said first machined surface of the pivot joint mounting member, and wherein the second pivot member is coupled to the first pivot member so as to permit the first pivot member to pivot with respect to the second pivot member about said pivot axis; and wherein the tubular cast body further comprises a second machined surface configured to support the unloading auger elbow assembly on the generally vertical auger tube and the second machined surface being machined concentric with the first pivot axis and substantially parallel to the first machined surface and being adjacent said inlet and wherein the cast body comprises a pivot arm connector formed on the auger elbow, and first and second mating surfaces formed on opposite sides respectively of the auger elbow.

* * * * *